No. 763,398. Patented June 28, 1904.

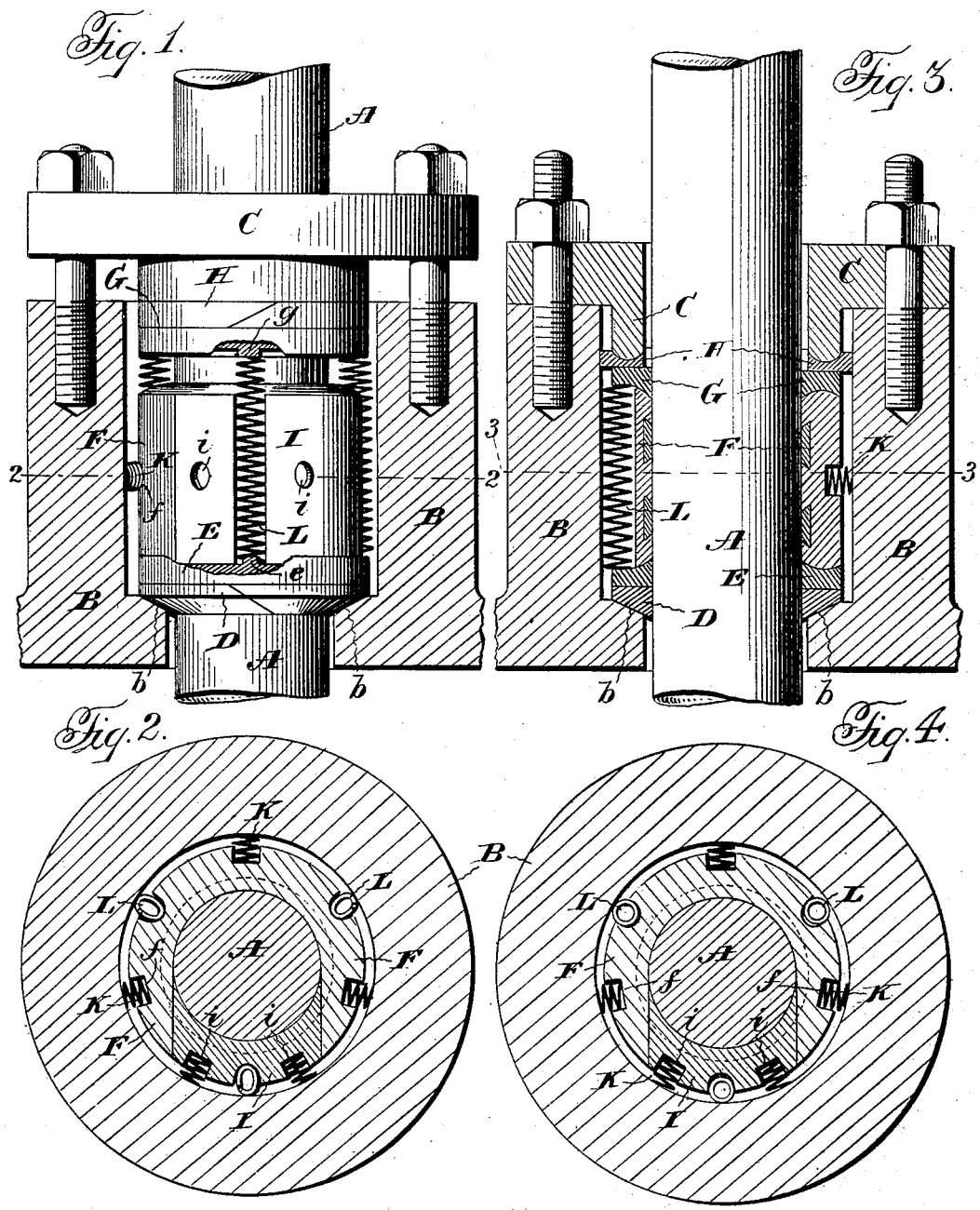

UNITED STATES PATENT OFFICE.

EDWIN A. HORN, OF SOUTH BETHLEHEM, PENNSYLVANIA.

PACKING.

SPECIFICATION forming part of Letters Patent No. 763,398, dated June 28, 1904.

Application filed May 7, 1900. Renewed September 12, 1902. Serial No. 123,155. (No model.)

*To all whom it may concern:*

Be it known that I, EDWIN A. HORN, of South Bethlehem, in the county of Northampton and State of Pennsylvania, have invented a new and useful Improvement in Packing; and I do hereby declare that the following is a full, clear, and exact description thereof, reference being had to the accompanying drawings, in which—

Figure 1 is a sectional view of a stuffing-box provided with my packing, certain parts of the packing being broken away. Fig. 2 is a sectional view taken on the line 2 2 of Fig. 1. Fig. 3 is a sectional view of the stuffing-box, showing the gland screwed down into place, the section being taken on the line 3 3 of Fig. 4; and Fig. 4 is a sectional view taken on the line 4 4 of Fig. 3.

The object of my invention has been to provide a rod-packing which shall be simple, very effective in operation, and which shall be capable of being made entirely of metal; and to such ends my invention consists in the rod-packing hereinafter specified.

In the drawings I have illustrated my invention as applied to an ordinary rod A, box B, and gland C; but I desire it to be understood that my invention is applicable to any form of stuffing-box in which two surfaces can be made to approach each other longitudinally of the rod. The lower end of the box B is preferably provided with a conical surface *b*, upon which rests a preferably Babbitt or other metal ring D. Such ring is preferably provided with a conical lower surface, which rests upon the surface *b* of the box, and is provided with a plane upper surface. The ring D is preferably split diagonally. Upon the upper surface of the ring D is supported a ring E, which is provided with a plane lower surface. The ring E is preferably likewise split. The ring E is preferably formed of brass, and its upper surface is provided with an annular groove which is adapted to receive the correspondingly-shaped lower end of a partial sleeve F, which bears against the rod A. The upper end of the sleeve F is curved in the form of an annular rib, and a ring G correspondingly shaped on its lower face rests upon the upper end of the sleeve. The ring G is preferably formed of brass. The upper surface of the ring G is a plane surface and supports a ring H, preferably formed of Babbitt metal and having a plane lower surface. The upper surface of the ring H is provided with an annular groove that is adapted to receive the lower convex annular surface of the gland C. The diameter of the lower convex surface of the gland is preferably larger than that of the ring H, so that when said parts are crowded together the tendency will be to expand the ring H against the walls of the box B, and for this purpose the ring H is split, and that preferably diagonally, as shown in Fig. 1. The ring G is likewise preferably split. A block I fills up the gap in the sleeve and completes the circle of the same. The sleeve F and block I are preferably provided with partial rings of Babbitt metal on their inner surfaces to take wear. As illustrated in Fig. 1, the sleeve and the block are provided with recesses *f* and *i*, in which are received the inner ends of coiled springs K, whose outer ends bear against the box B. The sleeve and block are also provided with longitudinal grooves, in which are seated springs L, the upper and lower ends of the springs, respectively, being preferably engaged by lugs *g* on the ring G and by lugs *e* on the ring E. The engagement with the said lugs prevents rotation of the rings relative to the sleeve and block. The springs L are preferably longer than the sleeve and block, so that they must be compressed in screwing down the gland to force the ring G in contact with the sleeve. Said springs are preferably, though not necessarily, elliptical in horizontal cross-section, the longer axis of the ellipse extending radially of the sleeve and box. It will readily be understood that when the springs L are allowed to elongate the major axis of the ellipse will be shortened, and the parts are so proportioned that such axis is preferably long enough to reach from the box to the bottom of the groove in the gland when the parts are elongated.

In the operation of my device the parts are assembled as shown in Fig. 1. When the gland is forced down, as shown in Fig. 3, the springs L are compressed, and the several sections of their coils, when viewed as in Fig. 3, are forced from a more inclined position to a less inclined position, thereby causing them to act like a strut and force the block and ring against the rod. This action is assisted by the springs K. When the parts have been forced to the position shown in Fig. 1, the ring D by being crowded against the conical bottom of the box has been forced around and made to snugly fit the rod. The ring E by being forced firmly against the upper surface of the ring D seals the split in the ring D. The action of the springs K and L, before described, forces the sleeve and the block firmly against the rod, and as the said sleeve and block by means of their convex lower ends make a good contact with the concave annular groove in the upper surface of the ring E steam is prevented from escaping to any great extent into the box B. The ring G by means of its annular groove makes a good joint with the convex upper end of the sleeve and block, and the plane upper face of the said ring contacting with the plane lower face of the ring H prevents the escape of steam through the split in the ring. The ring H being extended against the walls of the box by the action of the convex lower surface of the gland on the corresponding groove in the ring, such groove being normally of smaller diameter than the gland, fits snugly against the walls of the box and prevents the escape of steam at this point.

The packing has been found to be very effective in actual operation and to readily compensate for wear.

Having thus described my invention, what I claim is—

1. In a rod-packing, the combination of a split sleeve surrounding the rod, a part adapted when in an inclined position to bear against said sleeve and the wall of the stuffing-box, and means for forcing said part from a more to a less inclined position, to respectively increase or decrease the distance between such wall and said sleeve, whereby the sleeve is forced against the rod.

2. In a rod-packing, the combination of a split sleeve surrounding the rod, a part adapted when in an inclined position to bear against said sleeve and the wall of the stuffing-box, and means connected with the gland for forcing said part from a more to a less inclined position, to respectively increase or decrease the distance between such wall and said sleeve, whereby the sleeve is forced against the rod.

3. In a rod-packing, the combination of a sectional sleeve surrounding the rod, a coiled spring extending longitudinally of the rod between said sleeve and the stuffing-box, and means for compressing said spring to increase its diameter and force the sleeve against the rod.

4. In a rod-packing, the combination of a part adapted to bear against the rod, a coiled spring interposed between said part and the stuffing-box, and means for compressing said spring to increase its diameter, the maximum diameter of said spring when compressed being greater than the distance between said part and said box.

5. In a rod-packing, the combination of a part that is adapted to be moved in a certain direction for the purpose of packing, a coiled spring extending transversely to said direction and lying between said part and a fixed part, and means for compressing said spring to increase its diameter and move said first-mentioned part in said direction.

6. A packing, having a sleeve with rounded or convexed end portions, bearing-rings with cupped or concaved surfaces respectively receiving the convexed ends of the packing-sleeve, springs arranged transversely of the packing and bearing between the packing and the inner wall of the stuffing-box.

7. A rod-packing comprising a member adapted to encircle the rod to pack the same, and a spring extending longitudinally of the packing, and supported at its ends, the said spring bearing between the packing and the inner wall of the stuffing-box, the spring being elliptical or ovate in cross-section when extended, and adapted to be compressed when the gland of the stuffing-box is fastened in position, for the purpose set forth.

8. A rod-packing comprising a member adapted to encircle a rod to pack the same, an expansive spring placed transversely of the packing and acting between the stuffing-box and the packing, and a coil-spring extending longitudinally of the packing and bearing between the same and the inner wall of the stuffing-box, said coil-spring being elliptical or ovate in cross-sectional form, for the purpose specified.

9. A packing, comprising a sleeve, a bearing-ring at each end thereof and a coil-spring extending longitudinally of the sleeve and engaged with the bearing-rings, the spring, when extended, being of a length greater than that of the packing-sleeve and being elliptical in cross-sectional form.

10. A packing, comprising a sleeve, with a longitudinal groove in the outer face thereof, a coil-spring set in said groove and being elliptical in cross-sectional form when extended, the spring bearing between the sleeve and the inner wall of the stuffing-box, and a ring adapted to engage one end of the sleeve and connected with the adjacent end of the said spring.

11. A rod-packing, comprising a sleeve, bearing-rings engaging the ends of the sleeve, a ring of soft metal engaging the upper bearing-ring and encircling the rod, the said ring having a bore of greater diameter than the rod whereby it lies out of contact with the rod, transversely-arranged springs bearing against the sleeve and against the inner wall of the stuffing-box, and spring extending longitudinally of the sleeve and engaging the bearing-rings, the gland of the stuffing-box, when fastened in position, pressing the soft-metal ring outward to engage the inner wall of the stuffing-box, and also compressing the said longitudinally-extending springs, for the purpose set forth.

In testimony whereof I have signed my name to this specification in the presence of two subscribing witnesses.

EDWIN A. HORN.

Witnesses:
GEORGE W. ROLAND,
ISRAEL T. HARTZOG.